United States Patent [19]

Nobusawa

[11] 4,032,932

[45] June 28, 1977

[54] AUTOMATIC SHUTTER CONTROLS FOR CAMERAS

[75] Inventor: Tsukumo Nobusawa, Oizumi, Japan

[73] Assignee: Asahi Kogaku Kogyo Kabushiki Kaisha, Japan

[22] Filed: May 9, 1975

[21] Appl. No.: 576,021

[30] Foreign Application Priority Data

| May 11, 1974 | Japan | 49-52487 |
| July 8, 1974 | Japan | 49-78462 |
| Sept. 25, 1974 | Japan | 49-110205 |

[52] U.S. Cl. .............. 354/23 D; 354/24; 354/50; 354/60 A
[51] Int. Cl.$^2$ .......................... G03D 7/08
[58] Field of Search ........... 354/23 D, 60 A, 50, 354/51, 24

[56] References Cited

UNITED STATES PATENTS

| 3,748,979 | 7/1973 | Wada | 354/23 D |
| 3,769,887 | 11/1973 | Nobusawa | 354/23 D |
| 3,827,065 | 7/1974 | Wada | 354/23 D |
| 3,842,587 | 10/1974 | Strauss et al. | 354/23 D |
| 3,868,704 | 2/1975 | Yamada et al. | 354/23 D |
| 3,879,118 | 4/1975 | Kiyohara et al. | 354/23 D |
| 3,928,858 | 12/1975 | Sakurada et al. | 354/23 D |

FOREIGN PATENTS OR APPLICATIONS 2,328,422   1/1974   Germany .................... 354/23 D

*Primary Examiner*—Russell E. Adams
*Attorney, Agent, or Firm*—Steinberg and Blake

[57] ABSTRACT

A camera is provided with a photo-responsive pulse generator for generating pulses the number of which is determined by the logarithmically converted light intensity at an object which is to be photographed. A reference pulse generator is also provided for generating a series of reference pulses at intervals from one reference pulse to the next which become progressively greater. A shutter-operating plunger is available to the operator to be depressed for tripping the shutter, and this plunger is operatively connected to the photo-responsive pulse generator for activating the latter just prior to opening of the shutter and to the reference pulse generator for activating the latter simultaneously with opening of the shutter. A pulse-responsive structure is operatively connected with both of the pulse generators for receiving first pulses from the photo-responsive pulse generator and then pulses from the reference pulse generator, this pulse-responsive structure providing an output when a predetermined relationship is provided between the reference pulses received from the reference pulse generator and the pulses received from the photo-responsive pulse generator. A shutter-closing structure responds to the latter output for closing the shutter.

11 Claims, 21 Drawing Figures

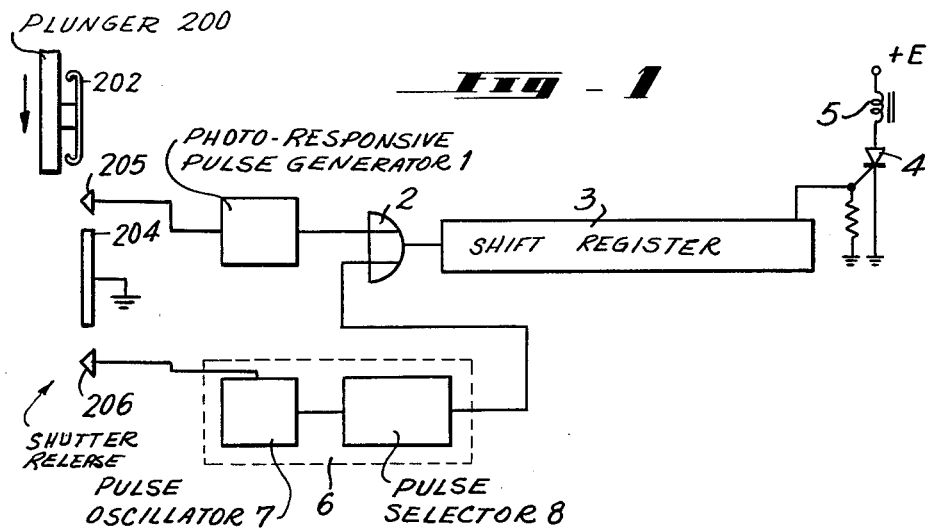
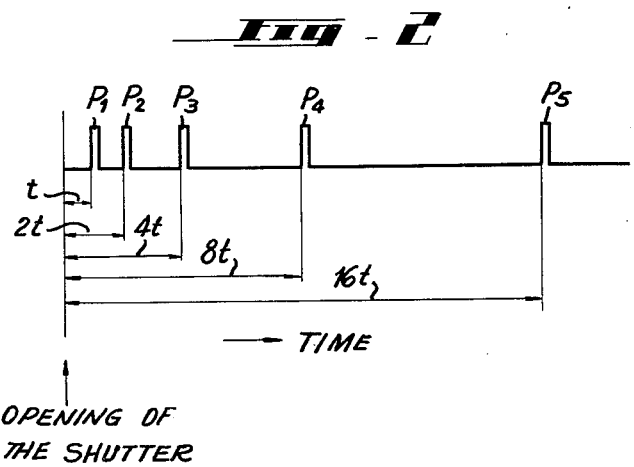
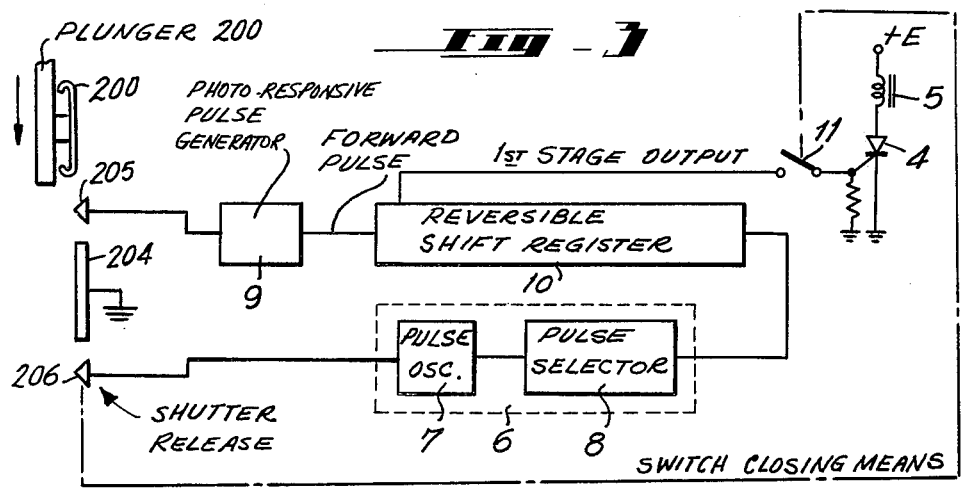

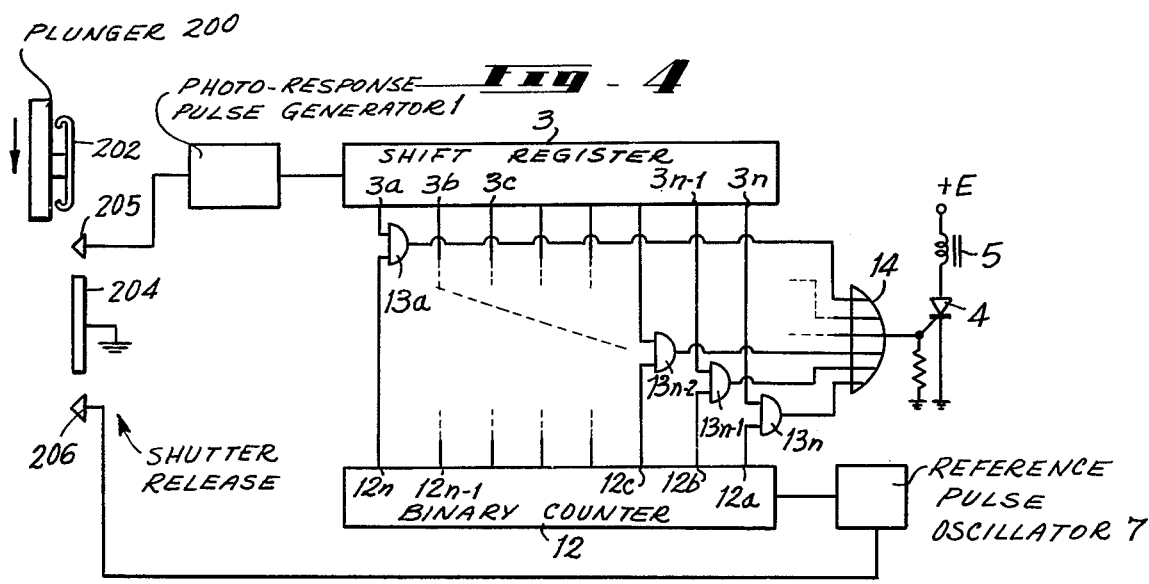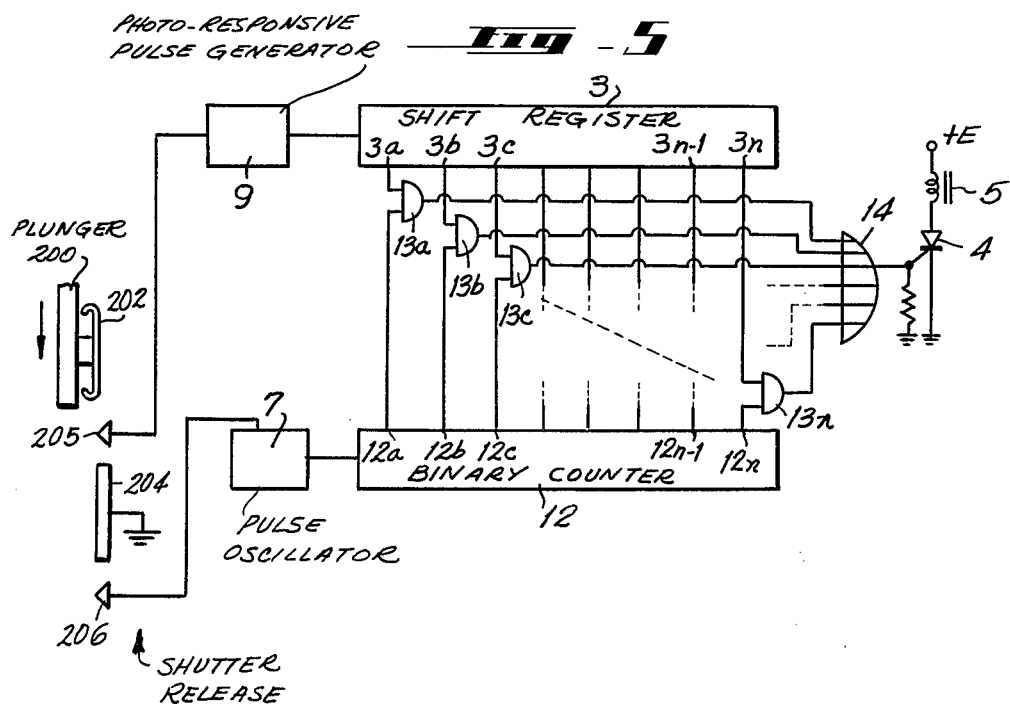

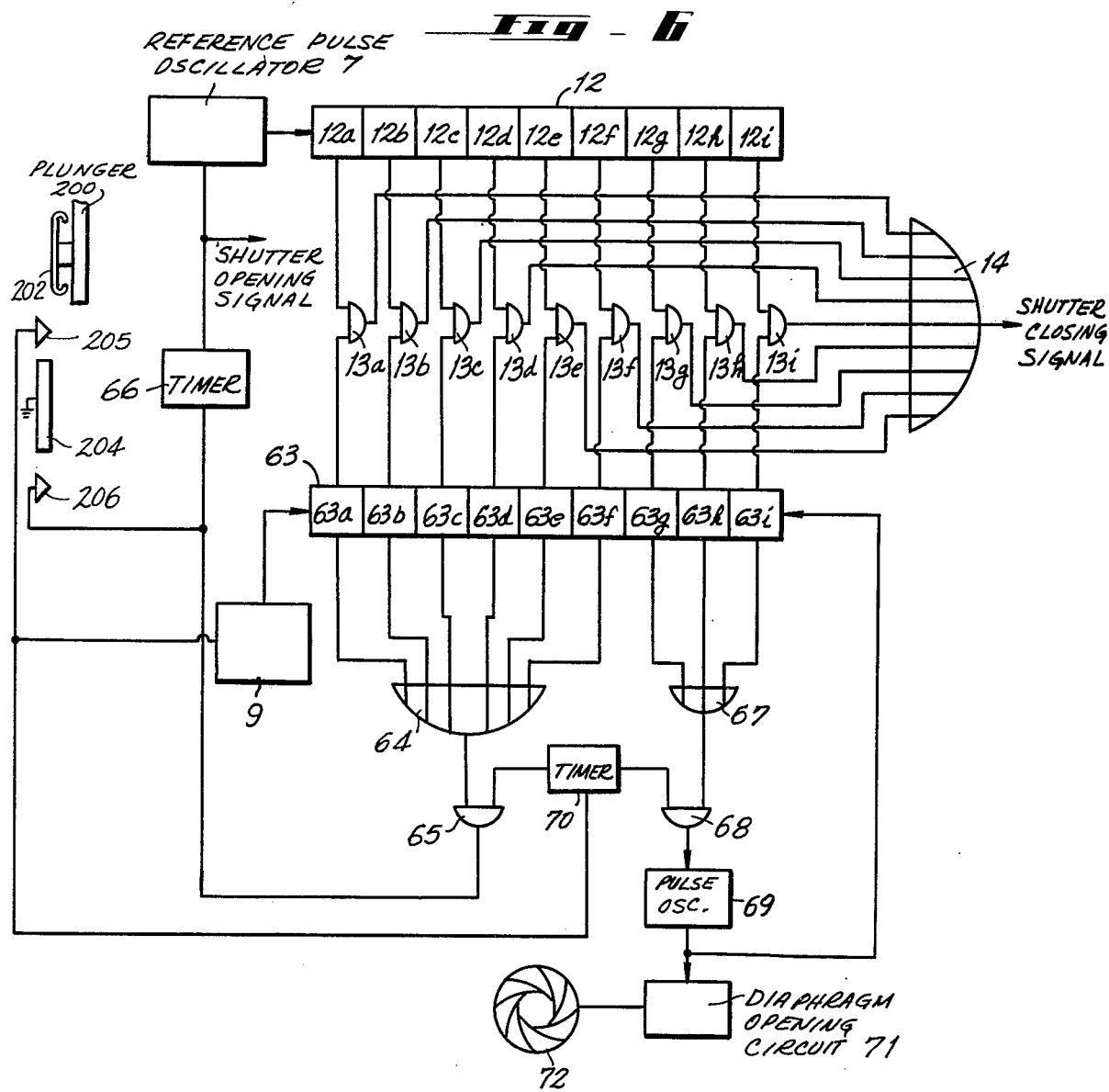

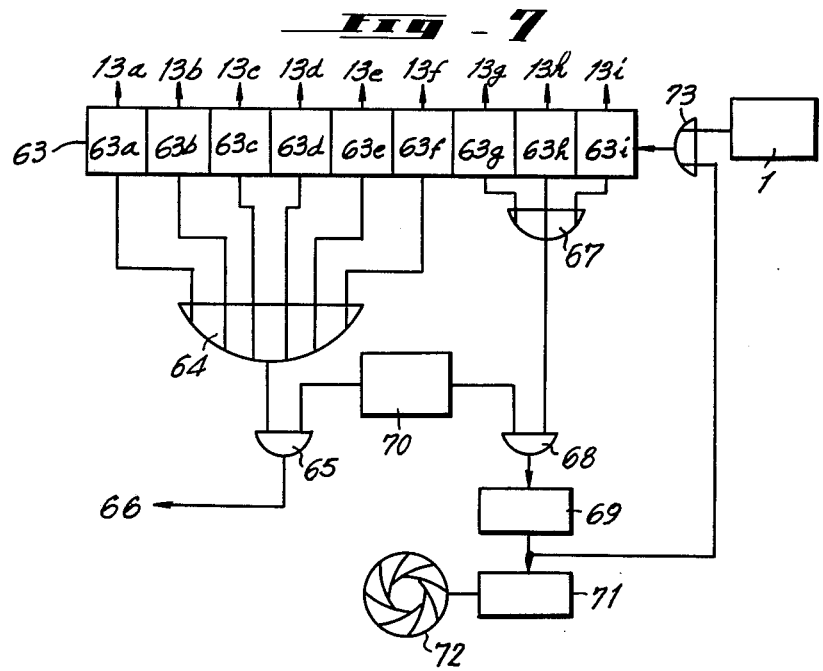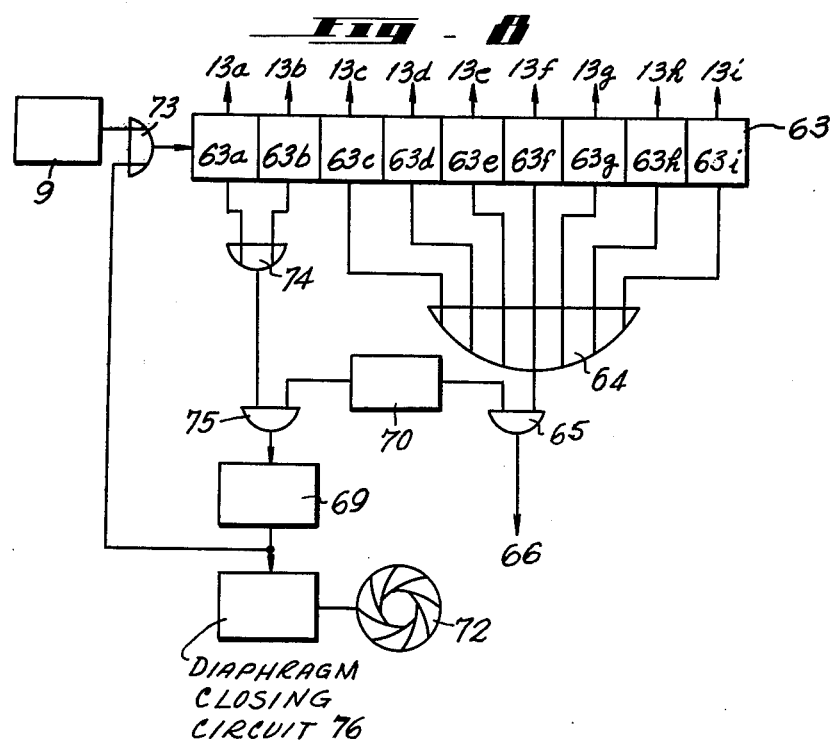

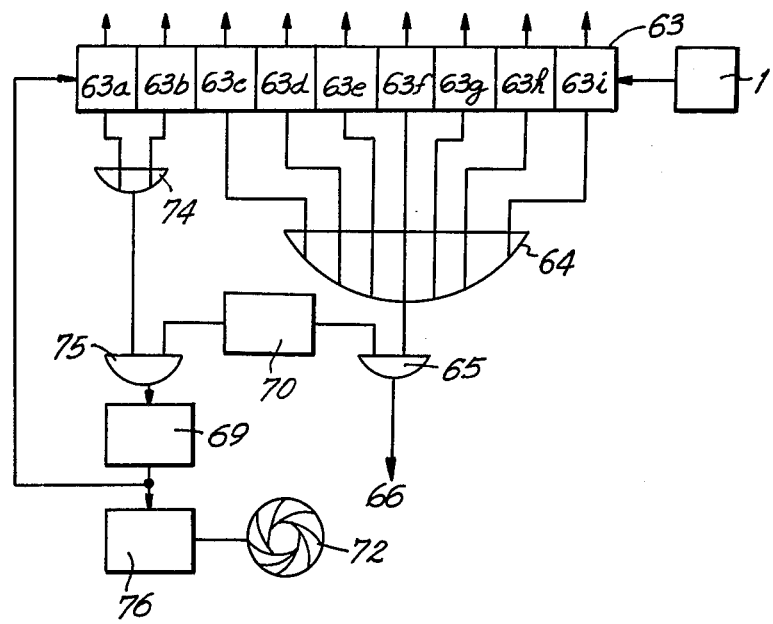
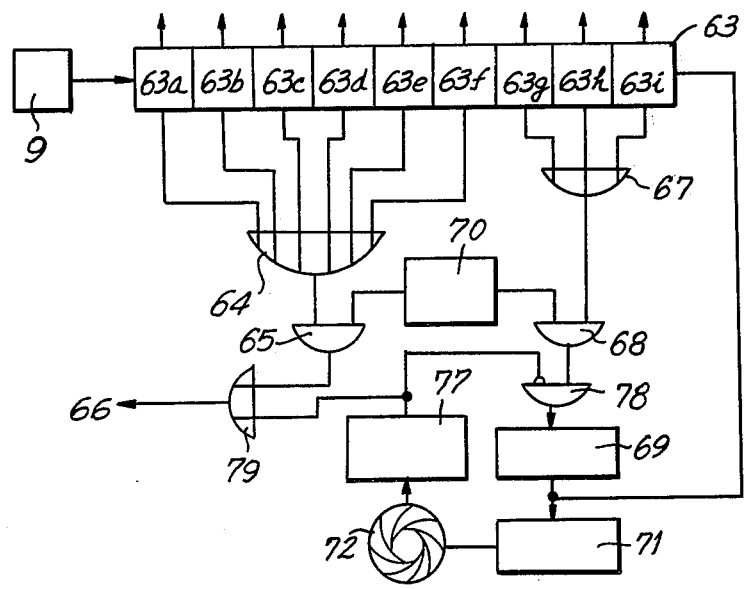

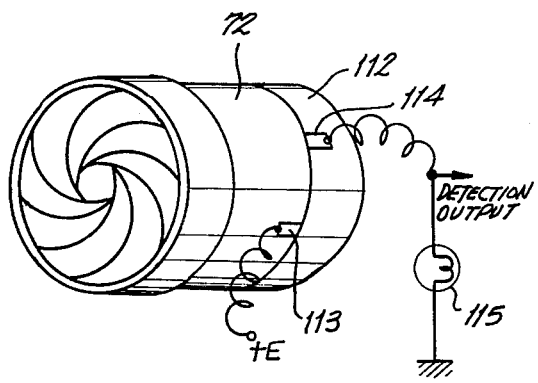
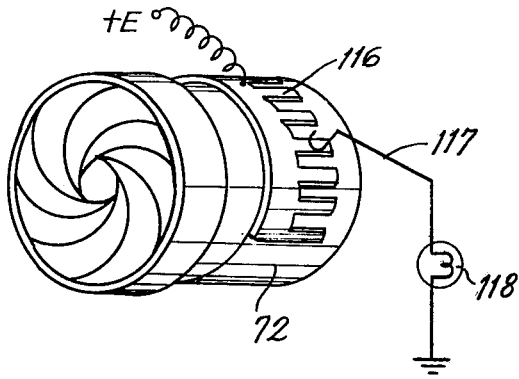
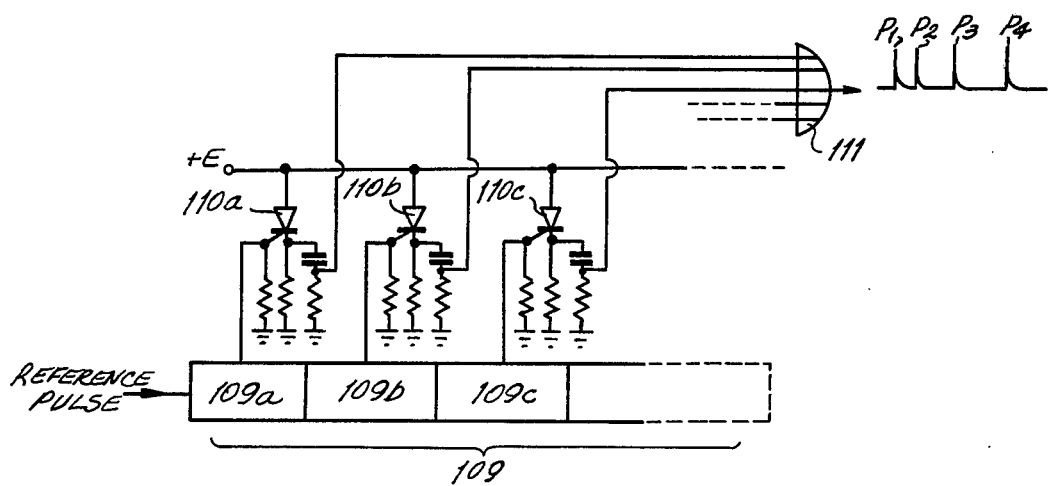

AUTOMATIC SHUTTER CONTROLS FOR CAMERAS

BACKGROUND OF THE INVENTION

The present invention relates to cameras.

In particular, the present invention relates to structures for automatically operating the shutter of a camera.

In connection with cameras which have through-the-lens light-measuring structure, it is well known that in order to control the exposure time automatically it is necessary to provide some means for storing information corresponding to the light intensity at the object to be photographed inasmuch as this information cannot be received just prior to opening of the shutter. Memory capacitors have been commonly used for this purpose. However, such capacitors are of a certain disadvantage in that the circuits required for transferring the information stored in the capacitor to a switching circuit for controlling the shutter often is complicated and easily results in undesirable errors.

It has already been proposed to provide automatic shutter controls for the above purposes of various types wherein a number of pulses are generated in accordance with the light intensity at the object to be photographed with additional factors such as the magnitude of the exposure aperture also being utilized for controlling the shutter. The particular number of pulses is stored, for example, in a digital memory device such as a binary counter, a reversible counter, or a shift register, and comparison pulses are generated in synchronism with opening of the shutter so that closing of the shutter takes place at the instant when the number of comparison pulses coincides with the number of stored pulses.

Structures of the above type do indeed have a certain advantage in that they involve smaller errors than in the case of shutter controls involving analog type of storing system utilizing, for example, a well-known memory capacitor. The improvement results from the fact that both the storing of the pulses corresponding to the light intensity and the control of the shutter time are carried out in a digital manner.

However, this latter type of construction also suffers from certain drawbacks. Thus it is essential to use with structure of this type, as presently known, a high frequency oscillator as a pulse oscillator to generate the pulses the number of which corresponds to the light intensity at the object to be photographed, when a range as wide as 1/100 to 15 sec. is utilized for shutter control, inasmuch as the period of time available for storing the pulses is as short as 0.1 to 0.05 sec., which is the period of time which elapses from the instant of depression of the shutter-releasing plunger up to the springing up of the mirror which terminates the measurement of light. The number of pulses is doubled each time the exposure time of the shutter is prolonged by 1 LV, for example, a single pulse being provided, for example, for 1/100 sec., two pulses being provided for an exposure time of 1/500 sec., and four pulses being provided for an exposure time of 1/250 sec., and so on. Thus, in this particular type of camera, the exposure time for the shutter is stored for every 1/1000 sec.

However, it is unnecessary to store a value for each 1/1000 sec. of exposure time when the light intensity is relatively high at the object to be photographed, while a relatively fine, precisely determined value must be stored for an exposure time corresponding to a range of relatively low light intensity. Particularly when exposing color film which has an extremely narrow latitude, it is preferable to determine the exposure time in relatively fine, small increments situated even between 1/1000 sec. and 1/500 sec.

In order to meet these latter requirements it is essential that the pulse oscillator have a frequency as high as several MHZ and the corresponding circuitry design is complex and difficult to provide.

SUMMARY OF THE INVENTION

It is accordingly a primary object of the present invention to provide an automatic exposure-time determing structure which will avoid the above drawbacks.

Thus, it is an object of the present invention to avoid the above drawbacks by providing for a camera shutter an exposure time controlling structure having a pulse oscillator which operates at a relatively low frequency while at the same time achieving exposure time controls over a relatively wide range.

A further object of the present invention is to provide for correcting the camera settings in an automatic manner in the case where the light intensity is so great that even at the shortest exposure time which the camera can provide a proper photograph will not be made as well as to correct for the case where the light intensity is so low that the exposure time required for a proper photograph would be so great as to result in blurring of the image due to unsteadiness of a hand-held camera.

Thus, it is a more specific object of the present invention to provide for these latter situations a construction which will automatically provide for the camera a proper exposure time which will result in a proper photograph while automatically resetting the diaphragm to provide an aperture which will compensate for the change in the exposure time which is automatically determined.

Moreover, it is an object of the present invention to provide for a camera the possibility of enabling the operator to select the values which will be considered as unacceptable for a proper photograph, inasmuch as the proper exposure time will depend upon a number of factors such as the capabilities of the particular camera, the skill of the photographer, and the particular photograph which is being made. Thus, the shortest possible exposure time will generally depend upon the construction of the particular camera which is used, while the longest possible exposure time will generally be limited by whether the camera is hand-held and the steadiness of the hand of the operator, although even in the case where the camera is supported on a tripod or the like there may be a limit on the longest possible exposure time in accordance with color reproduction when using color film. Thus, where there is such a great light intensity at the object to be photographed that even at the smallest exposure time an acceptable photograph will not be made, the value stored in accordance with the light intensity and the aperture setting are both adjusted so as to provide a longer exposure time corresponding to the shortest exposure time which can be provided by the camera while at the same time reducing the size of the exposure aperture. On the other hand, when photographing under conditions of unacceptably low light intensity, so that blurring will result from unsteadiness of a hand-held camera, the exposure time value which is stored is reduced while at the same time the aperture setting is increased to compensate for the reduction in the exposure time.

However, it is still a further object of the present invention to provide in this latter case the possibility of making a photograph even under conditions where the blurring might result from unsteadiness of a handheld camera, in the case where it is necessary to provide for the diaphragm an aperture setting which is so large that the depth of field will be undesirably shortened.

However, it is also an object of the present invention to provide a construction according to which no provision is made for correcting for extremely great light intensity while provision is made for correcting in the case of relatively low light intensity.

Thus, it is a further object of the present invention to provide a construction which is capable of automatically producing corrections when the light intensity of the object to be photographed is unacceptably high or unacceptably low with the possibility not only of providing a compensating correction at the exposure aperture but also providing for the possibility of selectively adjusting the limits of unacceptably high and unacceptably low light intensity.

Also, as pointed out above, it is an object of the present invention to provide a construction according to which the risk of blurring due to unsteadiness of a hand-held camera is accepted in the case where it is necessary to open the aperture to such a large extent that an undesirable shortening of the depth of field will result.

Yet another object of the present invention is to provide a structure for achieving an extremely fine, precise determination of the exposure time with a relatively simple highly reliable structure.

According to the invention a photo-responsive pulse-generating means is provided for generating a number of pulses according to the logarithmically converted light intensity at an object which is to be photographed. These pulses are transmitted to a pulse-responsive means such as a digital memory device, and upon opening of the shutter reference pulses derived from a reference-pulse generating means are transmitted to the pulse-responsive means to be compared with the number of pulses stored therein in accordance with the logarithmically converted light intensity at the object to be photographed. These reference pulses are successively provided at intervals from one reference pulse to the next which become progressively greater, and when a predetermined relationship is established between the reference pulses and the number of pulses received from the photo-responsive pulse-generating means, an output is provided for automatically actuating a shutter-closing means to close the shutter and terminate the exposure. The generation of the reference pulses is started in synchronism with the opening of the shutter.

Thus, it is possible to provide a relationship according to which the number of pulses generated by the photo-responsive pulse-generating means is proportional to the light intensity and to the latter number of pulses is added a number of reference pulses until a predetermined total number is reached to provide the required relationship which will determine the exposure time.

However, in the case where the number of pulses generated by the photo-responsive pulse-generating means is inversely proportional to the logarithmically converted light intensity at the object to be photographed, then the arrangement is such that the reference pulses which commence with the opening of the shutter are counted, and, for example, subtracted from pulses derived from the photo-responsive pulse-generating means so that when the number of reference pulses corresponds to the number of pulses received from the photo-responsive pulse-generating means an output is provided for automatically closing the shutter. However, in the case of a photo-responsive pulse-generating means which generates a number of pulses which is inversely proportional to the logarithmically converted light intensity at an object to be photographed, it is also possible to provide an arrangement where the reference pulses are added to the pulses derived from the photo-responsive pulse-generating means to provide an output which will automatically close the shutter when the sum of the stored number of pulses from the photo-responsive pulse-generating means and the number of reference pulses corresponds to a predetermined value.

In accordance with the present invention, the number of photo-responsive pulses corresponds to the logarithmically converted light intensity at the object to be photographed. In other words, the number of photo-responsive pulses is subject to a logarithmic compression. Accordingly, the reference pulses are successively provided at intervals from one reference pulse to the next which are progressively increased inasmuch as the determination of the exposure time requires a logarithmic expansion.

The pulse-responsive means may take the form of a shift register which receives and stores the number of pulses received from the photo-responsive pulse-generating means, this shift register having successive memory stages which become successively operative in accordance with the number of pulses received from the photo-responsive pulse-generating means. When a particular memory stage is energized at a setting corresponding to a condition which is unacceptable for achieving a proper photograph, a correcting means is automatically operated to shift the signal back to a memory stage corresponding to an acceptable photographing condition, and simultaneously a diaphragm-setting means is adjusted by the correcting means so as to compensate in this way for the change in the condition of the shift register. When the shift register is energized at a stage which corresponds to an acceptable photographing condition, then the determination of exposure time is started.

BRIEF DESCRIPTION OF DRAWINGS

The invention is illustrated by way of example in the accompanying drawings which form part of this application and in which:

FIG. 1 is a schematic illustration of an embodiment of the invention where reference pulses are added to previously stored pulses to determine the exposure time;

FIG. 2 is a graph illustrating the reference pulses;

FIG. 3 is a schematic illustration of an embodiment of the invention where the reference pulses are subtracted from the previously stored pulses determined by the light intensity;

FIGS. 4 and 5 respectively illustrates schematically different embodiments according to which the reference pulses are compared by suitable comparison circuits with the pulses stored from a photo-responsive pulse generator in order to achieve an output which will actuate a shutterclosing means;

FIG. 6 schematically illustrated an embodiment of the invention capable of automatically correcting for a condition where the exposure time would be too long;

FIG. 7 is a schematic illustration of another embodiment for achieving a correction for the case where the exposure time would be too long;

FIG. 8 is a schematic illustration of an embodiment for achieving a correction where the light intensity is too great;

FIG. 9 shows another embodiment for achieving a correction where the light intensity is too great;

FIG. 10 is a schematic illustration of an embodiment where a limitation is provided on the extent to which the aperture will be increased to achieve a correction;

FIGS. 16–19 respectively illustrated details of various units used in the embodiments referred to above; and FIGS. 20 and 21 respectively schematically illustrate structures used in the above embodiments in connection with automatic changing of the diaphragm setting.

DESCRIPTION OF PREFERRED EMBODIMENTS

Figure 11:
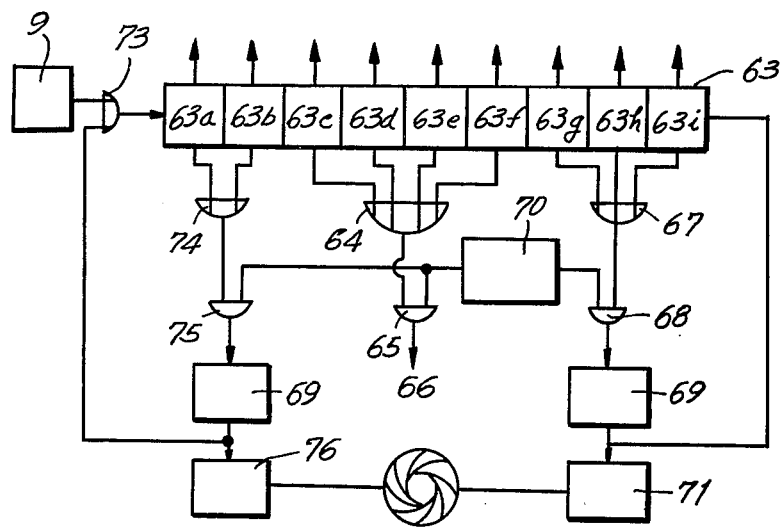
FIGS. 11 and 12 respectively illustrate different embodiments of the invention for automatically achieving corrections both in the case where there is too much light and in the case where there is too little light.

FIG. 1 illustrates an embodiment according to the present invention so arranged that the shutter is closed when the shift register has shifted to the last stage. Referring to FIG. 1, a photo-responsive pulse generator means 1 is adapted to generate a number of pulses proportional to the logarithmically converted light intensity of an object to be photographed. The number of generated pulses varies in the form of an arithmetic progression such as $m, m+1, m+2 \ldots$ even when the light intensity of the object to be photographed varies in the form of a series of multiples such as 1 LV, 2 LV, 3 LV, .... This photo-responsive pulse generator circuit 1 is activated, for example, at approximately the first half of depressing a release button 200 when part 202 thereof engages and slides along part 204 bridging the gap between the latter and contact 205 connected to means 1, as shown schematically in FIG. 1 so as to complete a circuit between means 1 and the grounded part 204. An OR gate 2 receives pulses from means 1, and a shift register 3 is supplied through OR gate 2 with photo-responsive pulses from said photo-responsive pulse generator 1 as shift pulses. At the initial state, the first stage of said shift register 3 has an output "1". SCR 4 serves as a switching element adapted to be applied with the last stage output of shift register 3 and to be turned ON by the output of shift register 3 when the latter has shifted to the last stage. Electromagnet 5 is provided to close the shutter.

A pulse train generator 6 is adapted to generate a pulse for each step of the time elapsing in the form of a geometric progression or series of multiples commencing with shutter opening when part 202 slides along part 204 beyond contact 205 and engages contact 206, thus connecting the latter to ground through element 204 during the continued depression of plunger 200. This pulse generator 6 comprises a reference pulse oscillator 7 adapted to generate reference pulses of a predetermined period and a pulse selector 8 adapted to pass the $s^n$th ($n = 0, 1, 2, \ldots$) pulses of the pulses generated by said reference pulse oscillator 7. Accordingly, the pulses from said pulse train generator 6 takes the form illustrated in FIG. 2 in which the time period from opening of the shutter to the moment at which each pulse is generated varies in the form of a geometric progression or series of multiples. The pulses generated by the pulse train generator 6 are applied through the OR gate 2 to said shift register 3 as shift pulses.

The manner in which this embodiment operates will be now described. The photo-responsive pulse generator 1 is activated at the first half of depressing the release button 200 and pulses generated in a number proportional to the logarithmically converted light intensity of an object to be photographed at this moment are applied to the shift register 3 as shift pulses. This number of pulses is large when the light intensity at the object is high and small when the light intensity at the object is low. When the shift register 3 is applied with these shift pulses, shifts occur from the first stage toward the last stage by a number of stages corresponding to the number of pulses. Thus, the light intensity at the object to be photographed at the moment is stored as the shift position of the shift register 3. Then toward the end of depressing the release button 200, the shutter is opened and at the same time the pulse train generator 6 is activated. Now, pulses $P_1, P_2, P_3 \ldots$ as illustrated in FIG. 2 are applied through the OR gate 2 to said shift register 3, which has already been shifted by the photo-responsive pulses to a certain position, to be shifted to a further stage. When shift register 3 has shifted to the last stage, the SCR 4 is turned ON by the last stage output of said shifter register 3 and the electromagnet 5 is excited to release the trailing curtain and close the shutter. Accordingly, the shutter time is determined by the period elapsing from opening of the shutter to the moment at which the shift register 3 shifts to the last stage, and, in this embodiment, the shutter time varies in the form of a series of multiples such as 1/1000 sec., 1/500 sec., 1/250 sec., ... according to the light intensity of the object to be photographed.

FIG. 3 illustrates another embodiment according to the present invention, wherein the shutter is closed when the shift register has been restored to its first stage. Referring to FIG. 3, a photo-responsive pulse generator means 9 is adapted to generate pulses the number of which is inversely proportional to the logarithmically converted light intensity at an object to be photographed and varying in the form of an arithmetic progression such as $m, m-1, m-2 \ldots$ relative to the light intensity at the object to be photographed which varies in the form of a series of multiples such as 1 LV, 2 LV, 3 LV, ... This photo-responsive pulse generator 9 is activated, for example, at the first half of depressing a release button 200, as set forth above in connection with FIG. 1. A reversible shift register 10 is adapted to be applied with photo-responsive pulses from photo-responsive pulse generator 9 as forward shift pulses and with pulses from a pulse train generator means 6 as reverse shift pulses. At the initial stage, the first stage of reversible shift register 10 has an output "1". SCR 4 of FIG. 3 is identical to that in FIG. 1, but in this embodiment, this SCR 4 has its gate input applied through a switch 11 with the first stage output of the reversible shift register 10. Switch 11 serves to prevent the SCR 4 from being turned ON at the initial state of reversible shift register 10 and is adapted to be closed upon opening of the shutter as shown schematically in FIG. 3. Such a function of this switch 11 is required in view of the fact that the SCR 4 should not be turned on before application of the photo-responsive pulses to the reversible shift register 10 which is initially at the first stage corresponding to the left hand end as seen in FIG. 3. Of course, the switch 11 may be replaced by any other means to prevent the SCR 4 from being turned ON before the shutter is opened. A pulse train generator means 6 which is identical to that used in FIG. 1 is adapated to generate pulses to be applied to reversible shift register 10 as reverse shift pulses.

The manner in which this embodiment of FIG. 3 operates will be now described. The photo-responsive pulse generator 9 is activated approximately at the first half of depressing release button 200, when part 202 engages part 204, and generates pulses in a number inversely proportional to the logarithmically converted light intensity at an object to be photographed at the moment. These pulses are applied to the reversible shift register 10 as forward shift pulses. Applied with these shift pulses, the reversible shift register 10 has shifted from the first stage toward the last stage by stages corresponding to the number of these pulses. Accordingly, the light intensity of the object at that moment is stored as the shift position of the reversible shift register 10. It should be noted here that the number of photo-responsive pulses is small and the extent of shift of the reversible shift register 10 which is applied with these pulses is also small when the light intensity of the object to be photographed is high, while the number of photo-responsive pulses is large and the extent of shift of the reversible shift register 10 is also large when the light intensity of the object to be photographed is low, since the number of photo-responsive pulses is inversely proportional to the logarithmically converted light intensity at the object to be photographed. Then, at the last half of depressing said release button, the shutter is opened at the same time the switch 11 is closed, allowing the SCR 4 to be turned ON, while the pulse train generator 6 is activated. Now, pulses such as pulses $P_1$, $P_2$, $P_3$, . . . as illustrated by FIG. 2 are successively applied to said reversible shift register 10, which has already been shifted to a certain position by application of the photo-responsive pulses, and the register is successively shifted in a reverse direction to be restored to the preceding stages. When shift register 10 has been restored to the first stage, SCR 4 is turned ON by the first stage output thereof and the electromagnet 5 is excited by SCR 4 to close the shutter. Accordingly, the shutter time is determined by the period elapsing from opening of the shutter to the moment at which the reversible shift register 10 is restored to its first stage. In this embodiment also the shutter time varying in the form of a series of multiples relative to the light intensity at the object to be photographed may be established.

FIGS. 4 and 5 illustrate still other embodiments of the present invention, wherein a shift register is used simply as a memory means and the desired shutter or exposure time is selected on the basis of a value from various exposure times provided by a shutter time determining circuit, of which FIG. 4 illustrates a case where a photo-responsive pulse generator generates pulses in a number proportional to logarithmically converted light intensity at an object to be photographed and FIG. 5 illustrates another case where said photo-responsive pulse generator generates pulses in a number inversely proportional to logarithmically converted light intensity at the object to be photographed.

Referring to FIG. 4, the photo-responsive pulse generator means 1 is adapted to generate pulses the number of which is proportional to the logarithmically converted light intensity of the object to the photographed, as mentioned above. Shift register 3 is identical to those of the above embodiments but is so arranged that outputs from respective stages thereof are taken out through the respective output terminals $3a$, $3b$, . . . $3n$. Accordingly, upon receiving an input of photo-responsive pulses from the photo-responsive pulse generator means 1, shift register 3 shifts from $3a$ toward $3n$ by the number of these input pulses, while its output is provided only from the output terminal corresponding to the shifted position of shift register 3. A reference pulse oscillator 7 of FIG. 4 is identical to that in the above embodiments. A binary circuit 12 serves as a shutter or exposure time determining circuit which has output terminals $12a$, $12b$, . . . $12n$ corresponding to but reversed with respect to the respective stages of shift register 3. The particular one of these output terminals which is in output condition shifts from $12a$ toward $12n$ as the time elapses in the form of a series of multiples after opening of the shutter. This binary circuit 12 may be, for example, a binary counter of well known type comprising serially connected flip-flops. Circuits $13a$, $13b$, . . . $13n$ are adapted to carry out the output comparison between the coresonding output terminals of shift register 3 and binary circuit 12. These comparison circuits are constituted, for example, by AND gates. An OR gate 14 receives the comparison output.

Now the manner in which the embodiment of FIG. 4 operates will be described. At the first half of depressing release button 200, the photo-responsive pulse generator means 1 is activated and pulses of the number proportional to logarithmically converted light intensity at an object to be photographed are applied to the shift register 3 as shift pulses. Shifts corresponding to the number of these shift pulses occur in the shift register 3. Accordingly, the light intensity at the object to be photographed at the moment has been stored as a given shift position of the shift register 3 which provides an output "1". Therefore, an output is provided only from that one output terminal of the output terminals $3a$, $3b$, . . . $3n$ of the shift register 3 that corresponds to said shift position. Then, upon depression of the release button 200 to the last half stage, the shutter is opened and simultaneously the reference pulses of a predetermined period from the reference pulse oscillator 7 are applied to the binary circuit 12. The output terminal $12a$ of binary circuit 1 has the output "1" upon application of the first one of the reference pulses. The output terminal $12b$ has the output "1" upon application of the second pulse, and the output terminal $12c$ has the output "1" upon application with the fourth pulse. The output condition thus shifts stage by stage upon each application with $2^n$th ($n = 0, 1, 2$ . . . ) reference pulse. With respect to the elapsing time, that one of the output terminals $12a$, $12b$, . . . $12n$ which is in output condition shifts from $12a$ toward $12n$ as the time elapses in the form of a series of multiples after opening of the shutter. When this output condition has shifted to the output terminal corresponding to the shift position of shift register 3, the correponding comparison circuit generates a signal which turns the SCR 4 ON through the OR gate 14 and excites the electromagnet 5 to close the shutter. Accordingly, the shutter time is determined by the period from opening of the shutter to the moment at which the output condition shifts to the output terminal of the binary circuit 12 that corresponds to the shift position of said shift register 3. Thus, in this embodiment also, the shutter time varying in the form of a series of multiples according to the light intensity of the object to be photographed may be established.

Referring to FIG. 5, a photo-responsive pulse generator means 9, which is identical to that used in the other embodiments, is adapted to generate pulses the number of which is inversely proportional to logarithmically converted light intensity of an object to be photographed. The other elements such as the shift register 3, the reference pulse oscillator 7 and the binary circuit 12 are identical to those used in the embodiment of FIG. 4. However, the binary circuit 12 has its stages arranged in a reverse order with respect to the embodiment of FIG. 4, since the photo-responsive pulse generator 9 is adapted, in this embodiment, to generate pulses the number of which is inversely proportional to logarithmically converted light intensity of the object to be photographed.

The manner in which this embodiment of FIG. 5 operates will now be described. At the first half stage of depressing release button 200, the photo-responsive pulse generator 9 is activated and the number of pulses inversely proportional to logarithmically converted light intensity of the object to be photographed are applied to the shift register 3 as shift pulses. Upon application with these shift pulses, the shift register 3 shifts from $3a$ toward $3n$. Accordingly, the output "1" is provided only from that one of the output terminals $3a$, $3b$, ... $3n$ of the shift register 3 that corresponds to the shift position. Then, upon depression of the release button to the last half stage, the shutter is opened and simultaneously the reference pulses of a predetermined period from the reference pulse oscillator 7 are input to the binary circuit 12. Now, in this binary circuit 12, the output condition shifts stage by stage from $12a$ toward $12n$ each time the number of input pulses reaches $2^n$. When this output condition has shifted to the output terminal corresponding to the shift position of said shift register 3, the corresponding comparison circuit generates a signal with which the shutter is closed. Thus, in this embodiment also, the shutter time varying in the form of a series of multiple may be established as in the embodiment of FIG. 4.

It will thus be seen that with the above embodiments of the invention units 1 and 9 form a photo-responsive pulse-generating means for generating pulses, the number of which is determined by the logarithmically converted light intensity at the object which is to be photographed. The unit 7 forms a reference-pulse generating means for generating reference pulses as shown in FIG. 2. The structure 3 and 10 of FIGS. 1 and 3 and the structure 3, 12 and the circuits therebetween in FIGS. 4 and 5 form a pulse-responsive means connected with both pulse-generating means in each embodiment to receive pulses from the photo-responsive pulse-generating means when the shutter-operating means 200 is partially depressed, just prior to opening of the shutter, while operation of the reference-pulse generating means 7 starts simultaneously with opening of the shutter by the shutter-operating means 200. In each case the pulse-receiving provides an output for actuating the shutter-closing means formed by SCR 4 and electromagnet 5.

Now, embodiments in which exposure-time correction and compensating aperture control may be achieved will be described.

Figure 16:
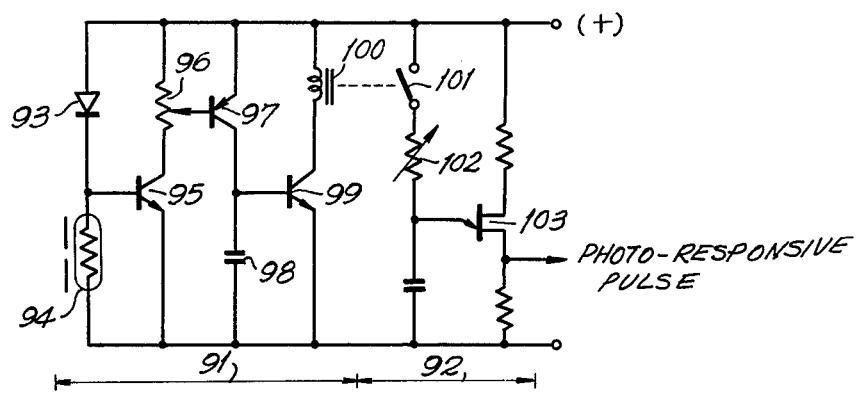

FIG. 16 illustrates how an embodiment such as FIG. 5 of the present invention may have, as a further feature of the invention, a compensating correction of the aperture value when a given light intensity of an object to be photographed is unacceptably low. It should be noted here that the unacceptably low light intensity is defined by a range in which the result may be affected by hand trembling or unsteadiness with a hand-held camera. A shift register 63 is adapted to be applied with photo-responsive pulses and to store them. This shift register 63 is arranged as a reversible shift register which is applied with the photo-responsive pulses as the rightward shift pulses and with pulses to effect a correcting operation of shift, as will be described more in detail below, as the leftward shift pulses, as viewed in FIG. 6. Reference numerals $63a$ to $63i$ designate respective memory stages of shift register 63. There is no limitation to the number of these stages and a desired number thereof may be provided. In this embodiment, the memory stages $63g$ to $63i$ of shift register 63 are assumed to define an unacceptable range or a range in which the light intensity of an object to be photographed is unacceptably low for proper photographing. In this embodiment, it is assumed that the shutter time corresponds just to 1/30 sec. when the signal has been stored in the memory stage $63g$, and a given object to be photographed is considered as being of unacceptably low light intensity when the object to be photographed requires an exposure time longer then 1/30 sec. When the signal has already been stored in any one of the memory stages $63a$ to $63f$ which define the acceptable range, this signal is applied through an OR circuit 64 and an AND gate 65 to a timer 66. When the signal has already been stored in any one of the memory stages $63g$ to $63i$ which define the unacceptable range, this signal is applied through an OR circuit 67 and an AND gate 68 to a pulse oscillator 69 and drives this pulse oscillator 69. Reference numeral 70 designates a timer adapted to keep the AND gates 65 and 68 closed until completion of storage operation or application of the pulses from the photo-responsive pulse generator 9 to the shift register 63 so that the signal may completely shift through the respective memory stages of shift register 63 from the stage $63a$ to the stage $63i$. The pulses from the pulse oscillator 69, adapted to be kept operating during application with the signal through the AND gate 68, are applied to the shift register 63 as the leftward or reverse shift pulses and also to a diaphragm opening circuit 71. This diaphragm opening circuit 71 functions to open a diaphragm 72 depending upon the number of thus applied pulses. The diaphragm opening circuit 71 may be a pulse motor, or other elements such as a meter or a servomotor adapted to convert the number of pulses into the corresponding voltage value and to operate at this voltage value. The timer 66 is adapted to provide a shutter opening signal a predetermined time after application with the signal through the AND gate 65 and to activate simultaneously the reference pulse oscillator 7.

Assuming that the signal has already been stored in the memory stage $63g$, for example, pulses are provided from the pulse oscillator 69 so as to shift the signal from the stage 63g to 63f and the diaphragm 72 is correspondingly opened. Timer 66 provides such a delay that the shutter opening occurs after diaphragm blades have been stopped, in view of a fact that the operation of diaphragm opening involves a more or less responsive delay.

The manner in which the embodiment of FIG. 6 operates will be now described. Upon depression of a release button 200 after the diaphragm 72 has been given a desired setting, the timer 70 is activated together with the photo-responsive pulse generator 9, for example, at the first half or initial stage of depression, and the pulses generated from said generator 9, of which the number is determined in inverse proportion to light intensity of a particular object to be photographed are applied to the shift register 63 as rightward shift pulses. Assuming that the light intensity of the object to be photographed is acceptable and the photo-responsive pulses have been applied by, for example, three to register 63, the signal which was initially stored in the memory stage 63a now shifts to the memory stage 63d. During this period, the AND gate 65 is kept closed and, therefore, the timer 66 is not activated. After a predetermined time has elapsed, the timer 70 ceases to operate and opens the AND gate 65, so that the signal stored in the memory stage 63d is now applied to the timer 66 which is, in turn, activated. The reference pulse oscillator 7 starts to operate when, after a predetermined time has elapsed, the timer 66 ceases to operate and provides a shutter opening signal. The pulses generated from the reference pulse oscillator 7 are applied to the binary counter 12 of which the bit stages 12a to 12i successively provide binary output. When the bit stage 12d provides the output, an AND circuit 13d is established and a shutter closing signal is provided. Accordingly, no correction of the aperture value occurs, since the light intensity of the object to be photogaphed is acceptable.

Now the case where the light intensity of the object to be photographed is unacceptably low in considered. Assuming, for example, that seven photo-responsive pulses are applied to the shift register 63, the signal shifts to the memory stage 63h and is stored therein. The AND gates 65 and 68 are kept closed during this storage operation just as in the previously mentioned case. When, after a predetermined time has elapsed, the timer 70 ceases to operate and the AND gate 68 is opened, the signal stored in the memory stage 63h is applied to the connecting means or pulse oscillator 69 which, in turn, starts to generate pulses. These pulses are applied to the shift register 63 as the leftward reversing shift pulses and cause the signal stored in the memory stage 63h to shift to the memory stage 63f which is included in the acceptable range. This operation of shifting from the memory stage 63h to the memory stage 63f is effected with two pulses, so that the pulse oscillator 69 ceases to operate when the signal has shifted to the memory stage 63f of said pulse oscillator 69 has provided two pulses. In parallel to this operation of shifting, on the other hand, these two pulses are input to the diaphragm opening circuit 71 which forms an adjusting means and in turn, opens the diaphgram 72 by a corresponding amount. This opening amount of the diaphragm 72 is such that the exposure time reduction due to shift of the signal from the memory stage 63h to the memory stage 63f may be effectively compensated. At the moment that the signal has shifted to the memory stage 63f by said operation of shifting, this signal is applied through the OR gate 64 and the AND gate 65 to the timer 66 and causes said timer 66 to start to operate. Simultaneously when, after a predetermined time has elapsed, the timer 66 ceases to operate and provides a shutter opening signal, the reference pulse oscillator 7 starts to operate. With output provided from the bit stage 12f of the binary counter 12, and AND gate circuit 13f is established and a shutter closing signal is obtained. With this embodiment, as aforementioned, in the case where the light intensity of the object to be photographed is unacceptably low and the photographing result may be affected by unsteadiness of a hand-held camera, the aperture value is automatically corrected and the stored value which determines the shutter time is also corrected to obtain a proper shutter speed.

FIG. 7 illustrates another embodiment of the present invention, wherein the aperture value is corrected when the light intensity of an object to be photographed is unacceptably low, as in the embodiment as illustrated by FIG. 6, but a photo-responsive pulse generator 1 is adapted to generate pulses the number of which is proportional to logarithmically converted intensity of said object. The reference pulse generator 7, the binary counter 12, the AND gates 13a to 13i etc. are similar to those in the embodiment illustrated in FIG. 6, and, therefore, no further description of these elements is given here. The photo-responsive pulses are applied through an OR gate 73 to the shift register 63 as shift pulses. The pulses generated from the pulse generator 69 also are applied through the OR circuit 73 thereto. It is not required to employ a reversible shift register as the shift register 63 in this embodiment, since the shift direction given by the pulses from the pulse generator 69 may be the same as the shift direction given by the photo-responsive pulses, as obviously understood from the aforegoing description. The manner in which this embodiment operates is substantially the same as the embodiment illustrated in FIG. 6 except with respect to shifting direction and, therefore, no further description thereof is given here.

Figure 18:
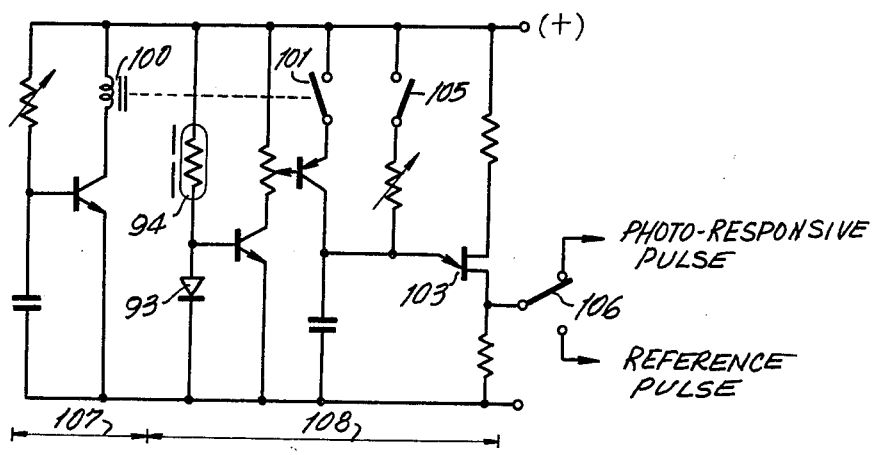

FIG. 18 illustrates still another embodiment of the present invention wherein the aperture value is corrected when the light intensity of an object to be photographed is unacceptably high. The shifting direction given by the photo-responsive pulses is same as that given by the pulses from the pulse generator 9 and, consequently, in this case also, the shift register 63 is not a reversible shift register. The shift register 63 is arranged in this embodiment so that the memory stages 63a and 63b correspond to the range of unacceptably high light intensity and the memory stages 63c to 63i correspond to the range of unacceptable light intensity. The memory stages 63a and 63b thus define the unacceptable range for photographing. According to this embodiment, a signal is stored, for example, in the memory stage 63b when light intensity of an object to be photographed is unacceptably high and, for example, a single photo-responsive pulse is applied to the shift register 63. This signal is applied through an OR gate 74 and an AND gate 75 to the pulse oscillator 69 when the timer 70 ceases to operate. The pulse oscillator 69 now starts to generate pulses which are, in turn, applied to the shift register 63 and a diaphragm closing circuit 76. Then, the signal stored in the memory stage 63b shifts to the memory stage 63c and the diaphragm 72 is closed by the corresponding amount. At a moment when the signal has shifted to the memory stage 63c as a result of said operation of shifting, said signal is applied through the OR gate 64 and the AND gate 65 to the timer 66. It will be understood from the aforegoing description that, according to this embodiment, the aperture value as well as the stored value which determines the shutter time are automatically corrected and a right exposure is obtained when light intensity of an object to be photographed is unacceptably high and even the highest shutter speed will result in over-exposure.

FIG. 9 illustrates further another embodiment of the present invention, in which the aperture value is corrected when light intensity of an object to be photographed is unacceptably high, as in the embodiment of FIG. 8, but the number of photo-responsive pulses is proportional to logarithmically converted light intensity of the object to be photographed. The pulses generated by the photo-responsive pulse generator 1 are applied as leftward shift pulses and the pulses generated by the pulse generator 69 are applied as rightward shift pulses, respectively, to the shift register 63. Accordingly, this shift register 63 is arranged as a reversible shift register. The manner in which this embodiment operates also is the same as the embodiment of FIG. 8, except with respect to the direction of shifting.

FIG. 10 illustrates another embodiment of the present invention, in which the depth of an object to be photographed is prevented from being excessively reduced during correction of the aperture value carried out when light intensity of the object to be photographed is unacceptably low. A detector circuit 77 adapted to detect whether the aperture value has reached a predetermined value or not forms a limiting means and the detection output thereof causes an inhibit gate 78 to be closed and causes a signal to be applied through an OR gate 79 to the timer 66. In the case where the signal has already been stored, for example, in the memory stage 63h of the shift register 63, the signal stored in the memory stage 63h is applied through the AND gate 68 and the inhibit gate 78 to the pulse oscillator 69 when the timer 70 ceases to operate and thereby said gate 68 is opened. The pulses from the pulse oscillator 69 are then applied to the shift register 63 and the diaphragm opening circuit 71. Assuming, for example, that a single pulse from the pulse oscillator 69 has been applied to the shift register 63 and the diaphragm opening circuit 71, then the stored signal has shifted from the memory stage 63h to the memory stage 63g and the diaphragm 72 has been opened by the corresponding amount to an aperture value corresponding to a predetermined value at the moment, the detector circuit 77 immediately provides its output upon detecting the limiting diaphragm setting. The inhibit gate 78 is now closed and the pulse oscillator 69 ceases to operate. Although no signal passes through the OR gate 64 and the AND gate 65 since the signal occupies the memory stage 63g at this time point, the output from said detector 77 may be applied through the OR circuit 79 to the timer 66 and thereby cause the latter to start. As obviously understood from the aforegoing description, with this embodiment, there is no danger that the diaphragm might be excessively opened and thereby the depth of an object to be photographed might be reduced beyond an intended depth, since, whenever the aperture value reaches a predetermined limit value during operation of diaphragm opening, a further opening of the diaphragm will be stopped.

In all the embodiments as described hereinabove, either the range of unacceptably high light intensity or the range of unacceptable low light intensity of an object to be photographed is considered as the unacceptable range of light intensity of the object for proper photographing. Now, embodiments in which the aperture value is corrected with respect to both these ranges will be described.

FIG. 11 illustrates an embodiment of the present invention in which the range of unacceptably high light intensity of an object to be photographed is defined by the memory stages 63a and 63b, the range of acceptable light intensity is defined by the memory stages 63c to 63f and the range of unacceptably low light intensity is defined by the memory stages 63g, 63h, and 63i of the shift register 63. According to this embodiment, when the signal has already been stored in one of the memory stages included in the range of unacceptably high light intensity, the diaphragm closing circuit 76 is activated and the rightward shift pulses are applied through the OR gate 73 to the shift register 63. Similarly, when the signal has already been stored in one of the memory stages included in the range of unacceptably low light intensity, the diaphragm opening circuit 71 is activated and the leftward shift pulses are applied to the shift register 63.

Figure 12:
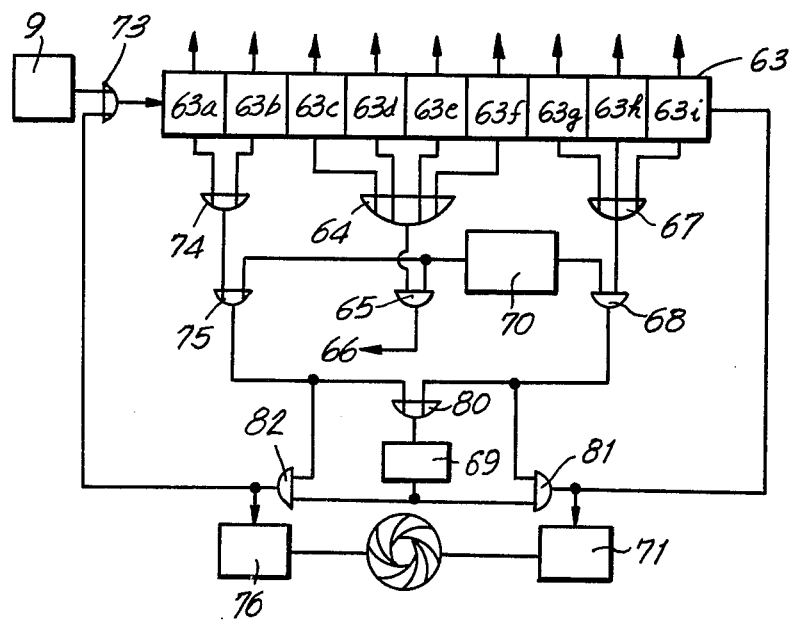

FIG. 12 illustrates an embodiment having the same function as the embodiment of FIG. 11 but using a single pulse oscillator 69. This embodiment inlcudes an OR gate 80 and AND gates 81 and 82, of which the AND gate 81 provides its output when the signal appears from the AND gate 68 and the AND gate 82 provides its output when the signal appears from the AND gate 75.

Figure 13:
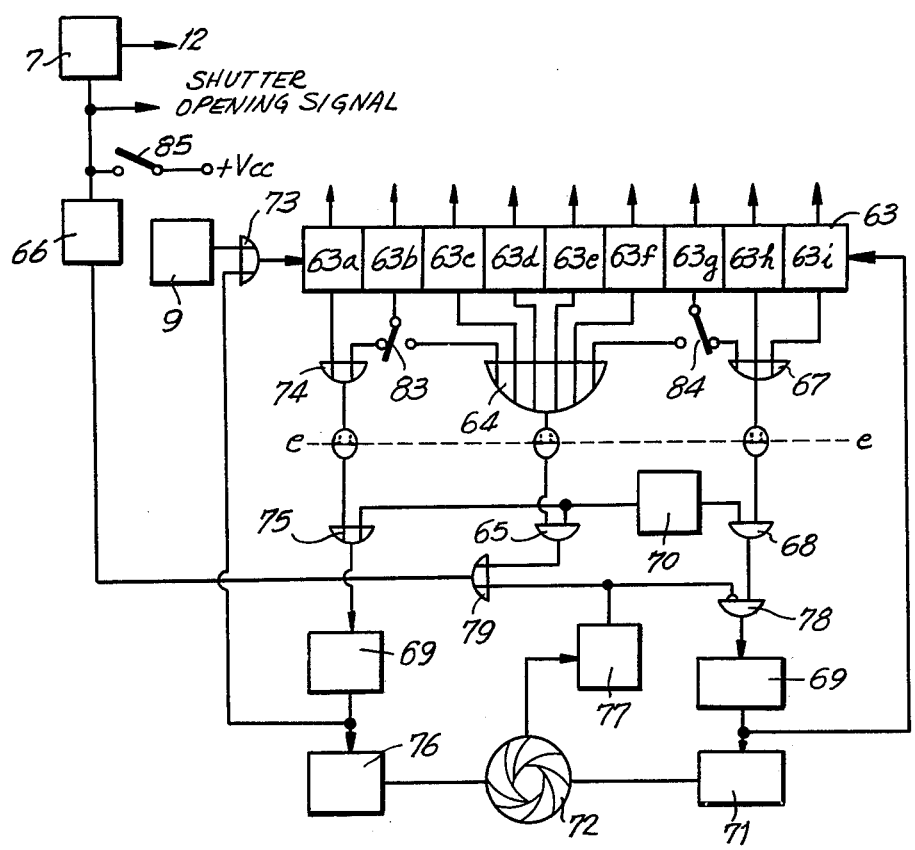
FIG. 13 schematically illustrates an embodiment similar to that of FIG. 11 where there is the added possibility of permitting the operator to select the limits which will determine when there is too much light or too little light.

FIG. 13 illustrates an embodiment in which the aperture value is corrected when light intensity of an object to be photographed is unacceptably low or unacceptably high and a further adjusting of the aperture value is stopped when the aperture value reaches a predetermined limit value in the course of correcting the aperture value. This embodiment corresponds to a combination of the embodiment as shown by FIG. 10 and the embodiment as shown by FIG. 11. The manner in which this embodiment operates will be therefore readily understood without description thereof more in detail.

A selecting means includes a switch 83 to make the upper limit of the unacceptable range variable. When switch 83 occupies the position as shown, for example, the memory stage 63b is included in the range of unacceptably high light intensity, but changing-over thereof brings this memory stage 63b into the range of acceptable light intensity. Accordingly, when the signal occupies the memory stage 63b or has shifted from the memory stage 63a to the memory stage 63b under the effect of pulses from the pulse oscillator 69 with the switch 83 having been changed over, photographing is carried out without any correction of the diaphragm 72, so that an over-exposure will result but photographing will be anyhow possible. A switch 84 of the selecting means serves to make the lower limit of the acceptable range variable. When the switch 84 occupies the position as illustrated, the memory stage 63g is included in the range of unacceptably low light intensity and changing over thereof brings this memory stage 63g into the acceptable range. Thus, photographing is possible so far as the signal occupies the memory stage 63g or has shifted from any one of the memory stages belonging to the unacceptable range to the memory stage 63g under the effect of pulses from the pulse oscillator 69. Accordingly, the shutter or exposure time may be increased by an extent corresponding to one memory stage. Switches like these switches 83 and 84 may be associated also with the other memory stages. The upper and lower limits of the acceptable range may be selectively adjusted by these switches so that photographing is possible as desired, depending on the skill and the photographing intention of a photographer. Furthermore, by providing prong-and-plug connectors at conductors crossing line e—e in FIG. 13, such an automatic diaphragm control device may be separated along the line e—e, and thereby the shutter can now operate in a manner similar to the shutter of FIG. 5. To effect shutter release, in this case, the switch 85 may be closed to provide the shutter opening signal and simultaneously the reference pulse oscillator 7 may be activated.

The embodiments as described hereinabove with reference to FIGS. 6 to 13 are of such a type that the electric shutter is applied with the shutter closing signal provided from comparison of the signal position in the shift register 63 with the signal position in the binary counter 12.

Figure 14:
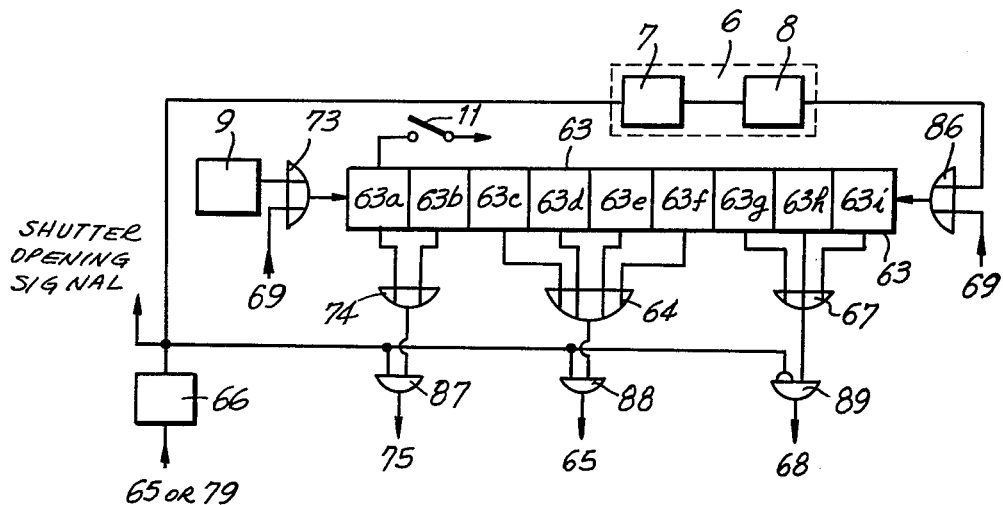
FIGS. 14 and 15 fragmentarily and schematically illustrate further embodiments for providing corrections in the case of both too much light and too little light.
Figure 15:
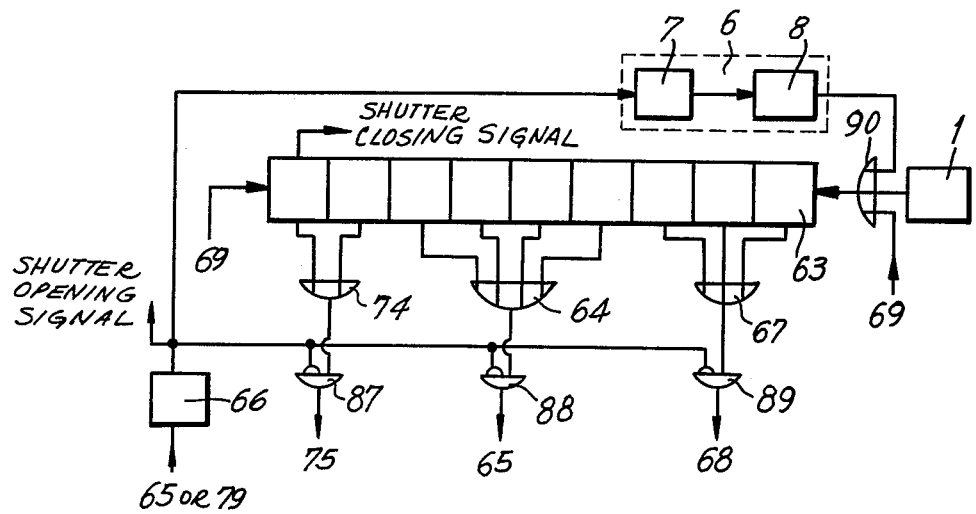

FIGS. 14 and 15 illustrate embodiments of the automatic diaphragm control device used for the electric shutter which is of the type shown in FIGS. 3 and 1, respectively.

FIG. 14 shows an embodiment of the diaphragm control in the electric shutter as shown in FIG. 3.

Assuming that the signal occupies, for example, any one of the memory stages 63a and 63b belonging to the range of unacceptably high light intensity, the pulses are applied through the OR gate 73 to the shift register 63 and shift the signal into the acceptable range. Assuming that the signal occupies any one of the memory stages 63g to 63i belonging to the range of unacceptably low light intensity, the pulses are applied through the OR gate 86 to the shift register 63 and shift the signal into the acceptable range. When the timer 66 ceases to operate, there is provided a shutter opening signal and at the same time the reference pulse train generator 6 also starts to operate. Inhibit gates 87, 88 and 89 are adapted to close upon shutter opening lest that the diaphragm control circuit should function after shutter opening.

FIG. 15 paricularly shows an embodiment of the diaphragm control in the electric shutter of FIG. 1. The photo-responsive pulses are applied through an OR gate 90 to the shift register 63 as the leftward shift pulses and the response pulses from the pulse train generator 6 also are applied through the OR gate 90 to the shift register 63 as the leftward shift pulses. The manner in which this embodiment operates is also substantially similar to that of the embodiment as illustrated by FIG. 1.

Of various electric circuits illustrated in block form in FIGS. 1 to 15, the most important circuits will be more specifically described.

Figure 17:
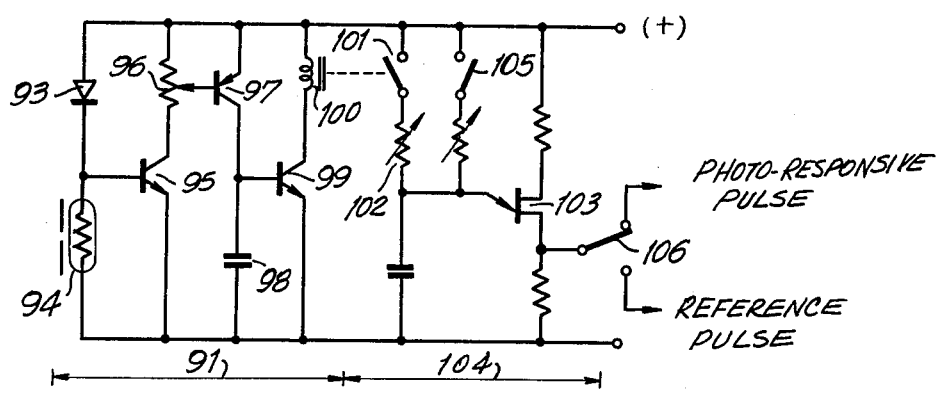

FIGS. 16 to 18 illustrate specific embodiments of the photo-responsive pulse generator 1 which is adapted to generate pulses the number of which is proportional to logarithmically converted light intensity of an object to be photographed.

The embodiment of FIG. 16 consists of a photoelectric timer circuit 91 and a pulse oscillator 92. Voltage under regulating effect of a log-compression diode 93 and a photosensitive CdS element 94 is applied through a transistor 95 and a variable resistance 96 to a transistor 97 so as to vary inner resistance of transistor 97. Transistor 97 constitutes together with a capacitor 98 a timer circuit. A switching transistor 99 is adapted to be applied with the terminal voltage of capacitor 98 and an electromagnet 100 is adapted to be excited, when transistor 99 is turned ON, to open a switch 101, a variable resistance 102 serving to vary the oscillation frequency of oscillator 92 which includes unijunction transistor 103.

FIG. 17 illustrates a pulse oscillator 104 serving also as reference pulse oscillator 7, wherein, to obtain photo-responsive pulses, a switch 105 is opened as shown and a switch 106 is connected as shown. When the pulse oscillator 104 operates as a reference pulse oscillator, on the other hand, the reference pulses may be generated by closing the switch 105 (it is obvious that the switch 101 is then opened) and changing over the switch 106. Thus, in this embodiment both pulse generating means are constituted in part by common structure. FIG. 18 illustrates a time circuit 107 comprising a conventional timer circuit which is independent of light intensity at an object to be photographed and a pulse oscillator 108 whose oscillation frequency is proportional to logarithmically converted light intensity at the object to be photographed. It should be noted here that the pulse oscillator 108 serves also at least in part, similarly to oscillator 104 of FIG. 17, as the reference pulse oscillator 7. The photo-responsive pulse generator 9 which is adapted to generate pulses by the number inversely proportional to logarithmically converted light intensity of an object to be photographed corresponds to the circuit as shown by FIGS. 16 to 18 wherein the log-compression diode 93 and the CdS 94 are exchanged or reversed with each other. It should be noted here that the variable resistance included in the timer circuit and the pulse oscillator, or in the pulse oscillator in FIGS. 16 to 18, may be utilized for introducing photographic exposure factors (such as the preset aperture value and the film sensitivity).

FIG. 19 illustrates a specific embodiment of the pulse selector circuit 8. A binary counter 109 has respective bit stages 109a, 109b, 109c, etc. SCRS 110a, 110b, 110c, etc. are adapted to be turned ON with the application of the respective bit stage outputs. Although only three SCRs associated with the respective bit stages have been illustrated, there are actually provided more than three SCRs. Each SCR is provided with a differentiating circuit pulse applied to an OR gate 111 when the SCR is turned ON. In this pulse selector, when the reference pulses from the reference pulse oscillator 7 are applied to the binary counter 109 upon opening of the shutter, there are provided from the respective bit stages 109a, 109b and 109c outputs in a binary manner. The SCRs 110a, 110b and 110c are successively turned ON with application of the first, second and fourth pulses of said reference pulses, so that the OR gate 111 provides a pulse train as illustrated. This pulse train is such that the period from opening of the shutter to the moment at which each pulse $P_1$, $P_2$, $P_3$, $P_4$, . . . is generated varies in the form of a series of multiples.

FIG. 20 illustrates a specific embodiment of the limiting means formed by detector 77. The structure includes a diaphragm ring 72 and an adjustable preset ring 112 serving to set the limiting aperture value. The diaphragm ring 72 is fixedly provided with a switch contact 113 adapted to be applied with the voltage E while the preset ring 112 is fixedly provided with a switch contact 114 which is, in turn, connected to a lamp 115. The photographer first rotates the preset ring 112 to set the limit aperture value. The diaphragm ring 72 is rotated with output from the diaphragm opening circuit 71 and if the switch contacts come into contact with each other, the lamp 115 is lit so that the photographer may visually confirm that the aperture value has varied to the preset limit value.

FIG. 21 illustrates an embodiment of the electric circuit serving to detect whether the diaphragm opening circuit 71 and the diaphragm closing circuit 76 have completed their operations. In this embodiment the diaphragm ring 72 is provided with a comb-like contact 116 applied with the voltage E when the main power switch is closed, for example during an initial increment of movement of the shutter-release button. A fixed contact 117 is in slidable contact with the teeth of contact 116. A lamp 118 is energized through these comb-teeth contacts 116 and fixed contact 117. With such an arrangement, connection and disconnection between the comb-teeth of contact 116 and the fixed contact 117 are repeated during operation of the diaphragm opening circuit 71 or the diaphragm closing circuit 76, in other words, during rotation of the diaphragm ring 72, and thereby the lamp 118 is correspondingly turned on and off. The photographer may visually confirm according to the blinking of the lamp 118 that the aperture value is varying and, when the lamp 118 ceases to be turned on and off, that the process of aperture value variation has been completed.

Although the invention has been described with reference to specific embodiments thereof as illustrated, it should be noted here that many modifications are possible unless these modifications prevent the present invention from being practically embodied. The first counting and storing section, for example, may be arranged so that instead of storing one pulse for 1 LV of the light intensity of an object to be photographed, a plurality of pulses are stored for 1 LV, or a single pulse is stored for 2 LV, for example, and the period of the frequency of the comparison pulses is correspondingly determined.

The diaphragm control as described in reference with FIG. 6 and the following figures is applicable also to a photographic camera in which the light measuring is performed with a fully open diaphragm. The diaphragm blades are kept open and only the diaphragm ring is rotatable, until a moment immediately before shutter release in such a photographic camera of so-called open diaphragm light measuring type, where the diaphragm is stopped down to the selected aperture just before exposure. Thus the arrangement may be such that the diaphragm opening circuit 72 and the diaphragm closing circuit 76 rotate the diaphragm ring, instead of directly driving the diaphragm blades. The automatic diaphragm control device according to the present invention as applicable to the electric shutter may be modified, so long as it is arranged so that there are generated pulses of the number in accordance with logarithmically converted light intensity of an object to be photographed and these pulses are stored.

In accordance with the present invention, the photo-responsive pulses of the number directly or inversely proportional to logarithmically converted light intensity of an object to be photographed are obtained, instead of directly converting the light intensity of the object to be photographed into the number of photo-responsive pulses, so that the variation in the number of photo-responsive pulses may be relatively small even when the light intensity of the object to be photographed varies over a wide range from a low brightness to a high brightness. Therefore, the present invention advantageously requires no high frequency oscillator because of the use of log-compression.

According to the present invention, the diaphragm is automatically stopped down and the stored value which determines the shutter time also is correspondingly corrected when light intensity of an object to be photographed is unacceptably high, so that for example, an over-exposure would result even with the highest shutter speed, so that a proper exposure is assured. On the contrary, if the light intensity of an object to be photographed is unacceptably low, so that the photographing result might be affected by hand trembling, the stored value is so corrected that a shutter time able to overcome the effect of such a hand trembling is provided and the diaphragm is correspndingly opened. A danger that the photographing result might be affected by a hand trembling is thus eliminated. Moreover, it is also possible to stop further operation of diaphragm opening when the aperture value reaches a predetermined value during operation of diaphragm opening, so that there is no danger that the depth of field of an object to be photographed might be excessively reduced. Furthermore, the light intensity range of an object to be photographed, within which the desired photographing is achieved, may be adjusted according to requirements such as the photographer's skill and the photographing intent.

What is claimed is:

1. In a camera, photo-responsive pulse-generating means for generating a number of pulses in accordance with the logarithmically converted light intensity at an object which is to be photographed, reference pulse-generating means for generating a series of reference pulses at intervals from one reference pulse to the next which become progressively greater, shutter-operating means for opening a shutter of the camera to make an exposure, said shutter-operating means being operatively connected with said photo-responsive pulse-generating means for activating the latter just prior to opening of the shutter and being operatively connected to said reference pulse-generating means for activating the latter simultaneously with opening of the shutter, pulse-responsive means operatively connected with both of said pulse-generating means for receiving from said photo-responsive pulse-generating means the number of pulses generated thereby prior to opening of the shutter and for then receiving pulses from said reference pulse-generating means and for providing an output when the number of pulses received from said reference pulse-generating means has a predetermined relationship with respect to the number of pulses received from said photo-responsive pulse-generating means, and shutter-closing means operatively connected with said pulse-responsive means for receiving said output therefrom and for responding to said output for closing the shutter.

2. The combination of claim 1 and wherein said photo-responsive pulse-generating means generates a number of pulses which is directly proportional to the logarithmically converted light intensity at the object to be photographed while said pulse-responsive means has a series of successive stages starting with a first stage and terminating with a final stage and said pulse-responsive means progressing successively from said first toward said final stage through the several stages therebetween in response to the pulses received from said photo-responsive pulse-generating means, said reference pulse-generating means continuing the progression of the pulses received by said pulse-responsive means from the number received from said photo-responsive pulse-generating means up to the final stage of said pulse-responsive means, and said final stage providing said output which operates said shutter-closing means.

3. The combination of claim 2 and wherein said pulse-responsive means is a pulse counter in the form of a shift register.

4. The combination of claim 1 and wherein said photo-responsive pulse-generating means generates a number of pulses which is inversely proportional to the logarithmically converted light intensity at an object which is to be photographed, and said pulse-responsive means being a reversible counter which has an initial state when receiving pulses from said photo-responsive pulse-generating means and which is advanced from said initial state in accordance with the number of pulses received from said photo-responsive pulse-generating means, said pulse-responsive means being operatively connected with said reference pulse-generating means for counting the pulses therefrom in a reverse direction with respect to the counting of pulses from said photo-responsive pulse-generating means so that the pulses from said reference pulse-generating means are subtracted from the pulses from said photo-responsive pulse-generating means until said pulse-responsive means returns to said initial state thereof, and said pulse-responsive means providing said output when returning to said initial state thereof.

5. The combination of claim 4 and wherein said reversible counter is a reversible shift register.

6. The combination of claim 1 and wherein said pulse-responsive means includes a shift register for receiving pulses from said photo-responsive pulse-generating means and a counter means operatively connected with said reference pulse-generating means for receiving pulses therefrom upon opening of the shutter and for counting said latter pulses, said counter means having a series of outputs which become successively energized in response to counting of said reference pulses with the latter pulses being separated one from the next by intervals each of which is a multiple of the immediately preceding interval, said outputs of said counter means respectively corresponding to stages of said shift register, and said pulse-responsive means including a plurality of comparison means respectively connecting each stage of said shift register with the output of said counter means corresponding thereto, and said plurality of said comparison means responding to provide an output when an output of said counter means is interconnected with a stage of said shift register which corresponds to the number of pulses received thereby from said photo-responsive pulse-generating means, and said shutter-closing means being operatively connected with said plurality of comparison means for responding to that one thereof which provides an output for closing the shutter.

7. The combination of claim 1 and including a diaphragm-setting means for determining an exposure aperture and an adjusting means operatively connected with said diaphragm-setting means for adjusting the latter, correcting means operatively connected with said pulse-responsive means and said adjusting means for detecting when the number of pulses received by said pulse-responsive means is at a value unacceptable for a good photograph and for correcting said pulse-responsive means while also actuating said adjusting means to adjust said diaphragm-setting means to provide an exposure aperture which will compensate for the correcting of said pulse-responsive means, and delay means operatively connected with said pulse-responsive means for delaying the providing of said output therefrom to actuate said shutter-closing means until the pulse-responsive means has been corrected by said correcting means.

8. The combination of claim 7 and wherein the pulse-responsive means is in an unacceptable state for making a proper photograph when the light intensity of the object to be photographed is too low, said adjusting means actuating said diaphragm-setting means to provide a setting for a larger exposure aperture while said correcting means acts on said pulse-responsive means to set the latter in a condition corresponding to a shorter exposure time, and limiting means operatively connected with said diaphragm-setting means for providing a predetermined limit on the magnitude of the exposure aperture, said limiting means when detecting said limit acting through said delay means to provide said output for actuating said shutter-closing means even if the condition of said pulse-responsive means does not correspond to the longest acceptable exposure time.

9. The combination of claim 7 and wherein said correcting means is operatively connected with said pulse-responsive means for correcting both for a condition of too little light and for a condition of too much light.

10. The combination of claim 7 and wherein a selecting means is operatively connected with said pulse-responsive means for selecting the condition thereof which will correspond to an unacceptable photographing condition.

11. The combination of claim 1 and wherein said photo-responsive pulse-generating means and said reference pulse-generating means include a common structure which forms at least part of both pulse-generating means.

* * * * *